United States Patent [19]

Smalley et al.

[11] Patent Number: 4,606,433
[45] Date of Patent: Aug. 19, 1986

[54] STEP CONVERTIBLE PLATFORM LIFT

[75] Inventors: Raymond L. Smalley; Melvin G. Risner, both of Carey; William D. Sherman, Upper Sandusky, all of Ohio

[73] Assignee: REB Manufacturing, Inc., Carey, Ohio

[21] Appl. No.: 665,727

[22] Filed: Oct. 29, 1984

[51] Int. Cl.[4] .............................................. B66B 9/20
[52] U.S. Cl. .................................. 187/9 R; 414/921; 280/166
[58] Field of Search ............. 187/9 R, 8.52; 414/921, 414/917, 540, 545, 546, 480; 280/166, 163; 105/447–449

[56] References Cited

U.S. PATENT DOCUMENTS

| | | | |
|---|---|---|---|
| 1,572,202 | 2/1926 | Goulet . | |
| 4,005,788 | 2/1977 | Ratliff | 214/77 P |
| 4,027,807 | 6/1977 | Thorley | 214/75 R |
| 4,081,091 | 3/1978 | Thorley | 214/75 R |
| 4,124,096 | 11/1978 | Dudynskyj et al. | 187/9 R |
| 4,124,097 | 11/1978 | Hawks et al. | 187/9 R |
| 4,124,100 | 11/1978 | Hawks | 187/9 R |
| 4,124,130 | 11/1978 | Rohrs et al. | 187/8.52 |
| 4,164,292 | 8/1979 | Karkau | 187/9 R |
| 4,168,134 | 9/1979 | Pohl | 414/545 |
| 4,176,999 | 12/1979 | Thorley | 414/540 |
| 4,180,366 | 12/1979 | Roth et al. | 414/540 |
| 4,219,104 | 8/1980 | MacLeod | 187/9 R |
| 4,251,179 | 2/1981 | Thorley | 414/545 |
| 4,270,630 | 6/1981 | Karkau | 414/545 |
| 4,273,217 | 6/1981 | Kajita | 187/9 R |
| 4,285,416 | 8/1981 | Kudynskyj | 187/9 R |
| 4,344,508 | 8/1982 | Peck | 187/9 R |
| 4,381,899 | 5/1983 | Merkle | 414/556 |
| 4,441,850 | 4/1984 | Thorley | 414/545 |

Primary Examiner—Joseph J. Rolla
Assistant Examiner—Kenneth Noland
Attorney, Agent, or Firm—Hugh Adam Kirk

[57] ABSTRACT

The disclosure concerns steps interchangeable into a platform lift, such as for wheelchairs for vehicles. Such a convertible step lift comprises a frame mounted in a rectangular notched-out floor section, which frame comprises corner posts which also act as guides for up and down movement of the platform lift. The movable platform comprises three sections foldable into a lower step, a riser, and an upper step, which sections are pivoted on shafts along their adjacent edges. The pivot shaft for upper step section and riser also is connected to reciprocating motor means for raising and lowering the platform. Lever extensions are fixedly attached to the ends of the riser, which are pivotally connected to other reciprocating motor means which unfolds the riser from an acute angle under the upper step section into a position coplanar with the upper step and at the same time moves the lower step section horizontally outwardly and upwardly into the same coplane to form the platform. At the outer edge of the lower step section is another shaft to which a barrier plate and a ramp are pivoted and normally urged into their operative positions when the step sections are in platform position. The barrier is folded down by levers and links when the platform engages the ground. An additional lever connected to an end of the riser folds the ramp and the barrier into their inoperative positions when the sections are in their step position.

33 Claims, 7 Drawing Figures

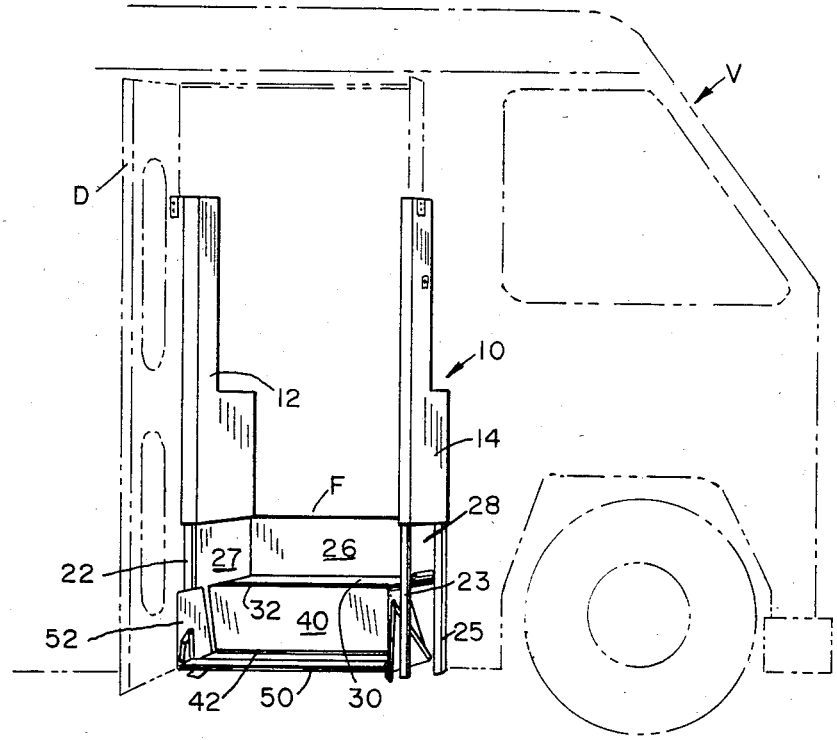
Fig I
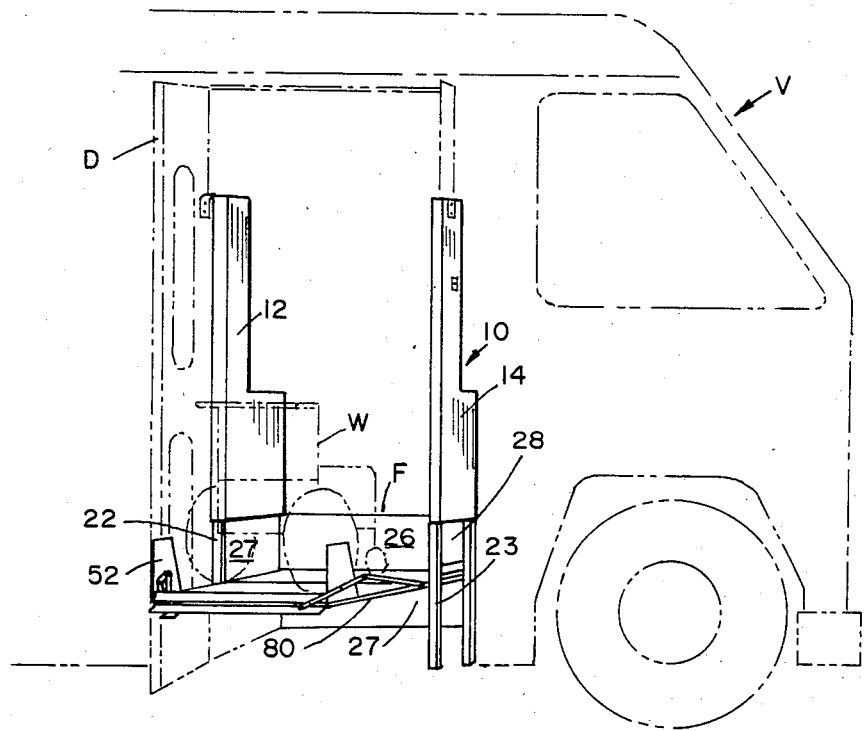
Fig II

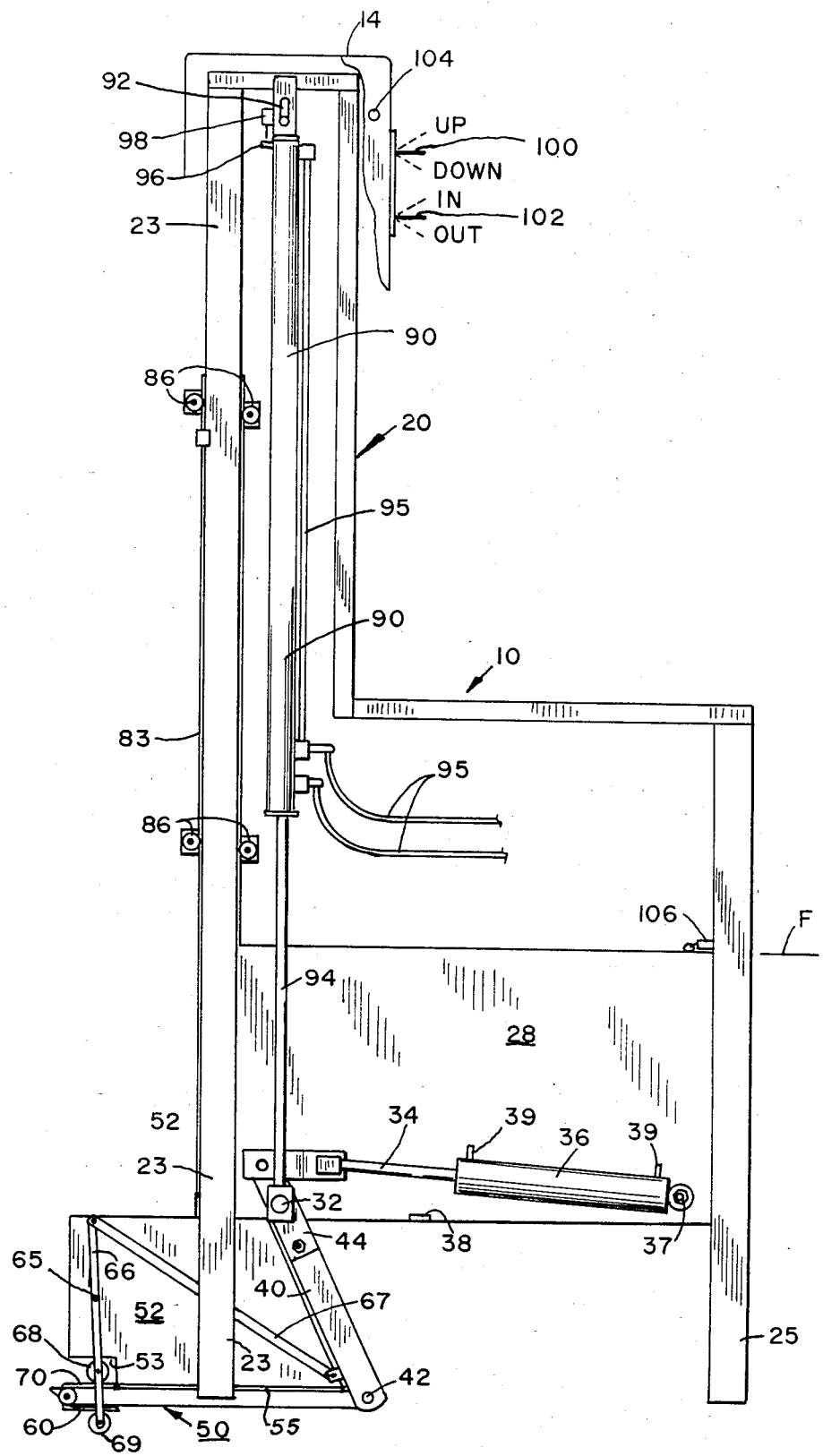
Fig III

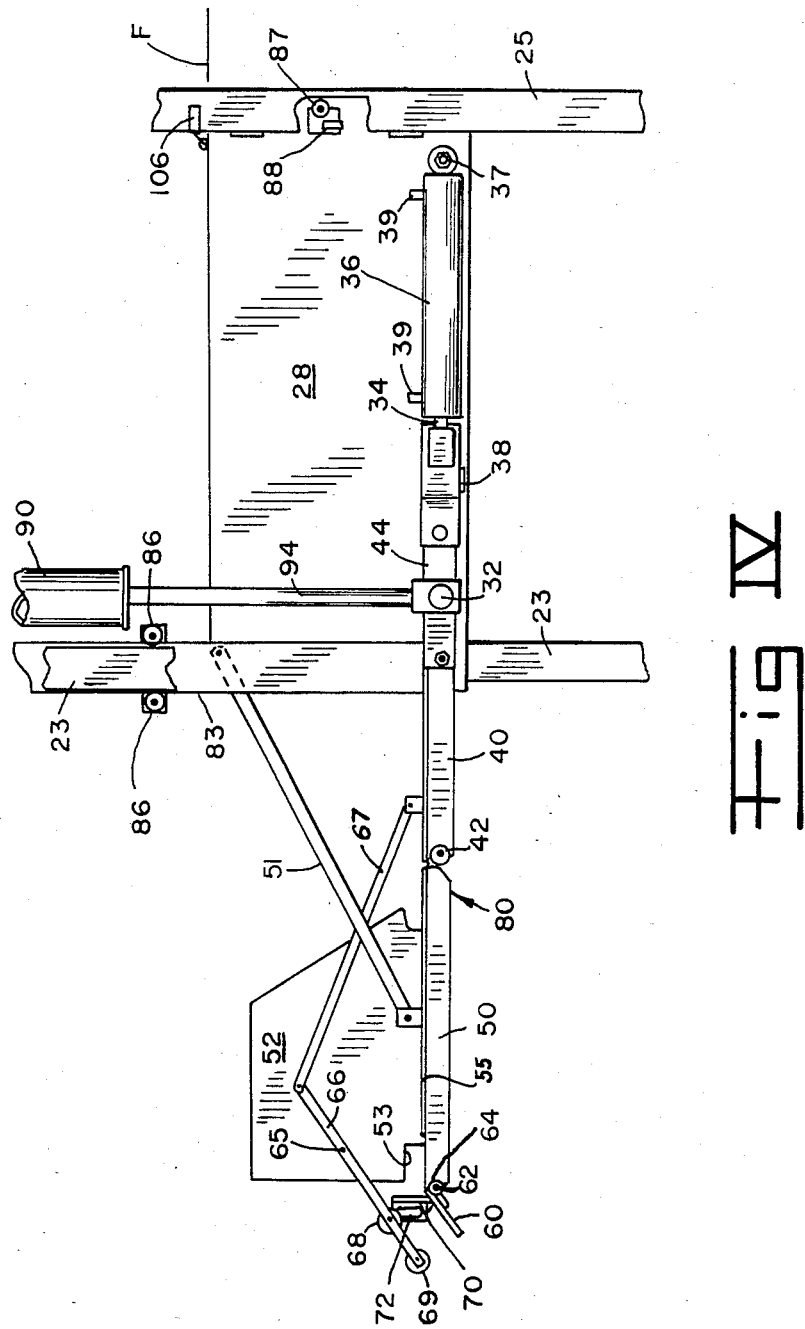

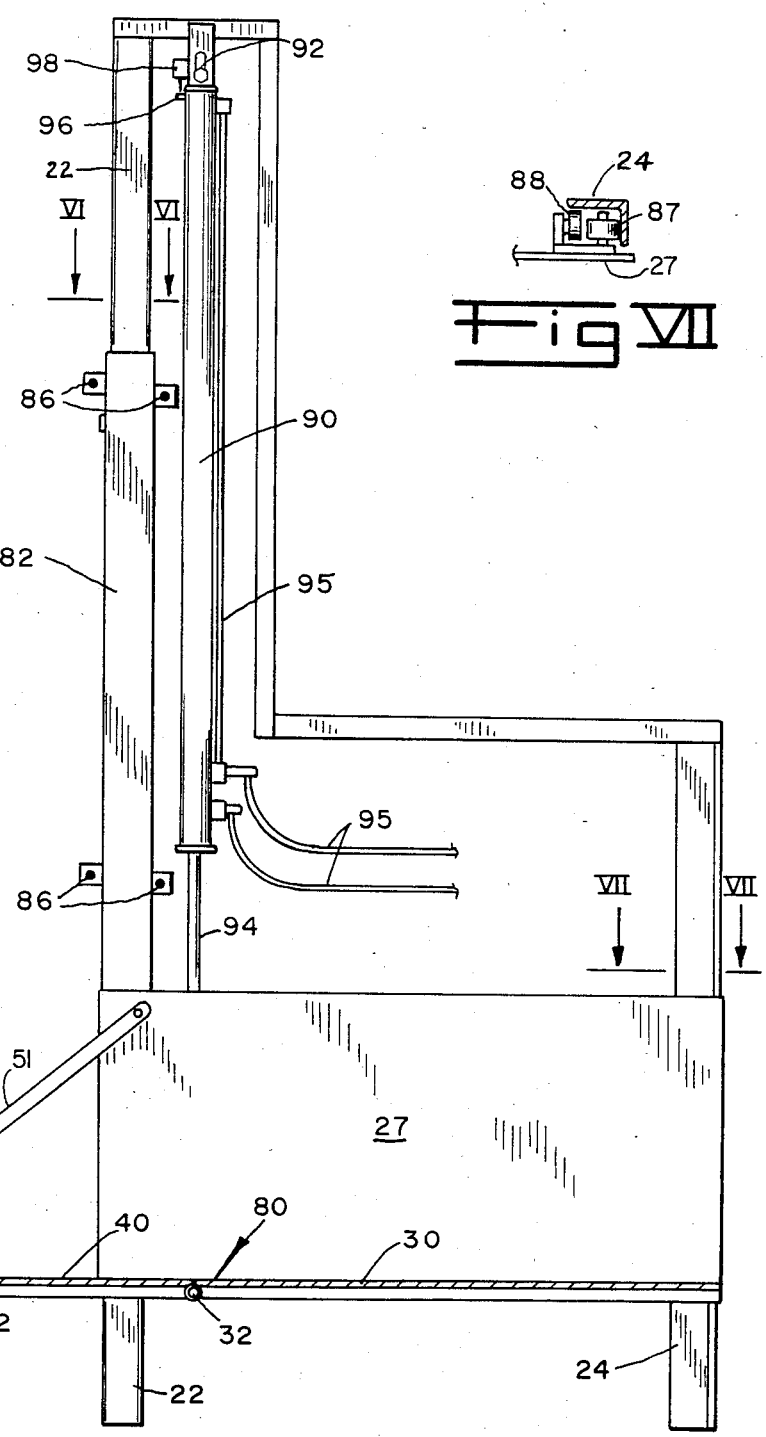

STEP CONVERTIBLE PLATFORM LIFT

BACKGROUND OF THE INVENTION

Previously there have been many different varieties of convertible steps into platforms for wheelchair lifts which usually comprise a plurality of levers and links in comparatively complicated arrangements. These included, of course, reciprocating motors, such as hydraulic pistons for raising and lowering the platform, separate reciprocating motors, such as hydraulic pistons for converting steps into platforms and vice versa, which pistons are connected directly to parts of the steps or connected to levers and links which are connected to parts of the steps. Furthermore, it is known that such reciprocating motors also may be provided with links for operating barriers and ramps on the front edges of the platforms. All of these known mechanisms involve relatively complicated structures for making them more automatic, which employ many moving parts which require maintenance and are subject to failure. Also many of these prior mechanisms were not provided with automatic safety devices, which could cause them to be dangerous if not properly attended during their operation.

OBJECTS AND ADVANTAGES

Accordingly, it is an object of this invention to produce a simple, efficient, effective and economic remotely controllable convertible step platform lift for converting the steps on a passenger vehicle into a platform for wheelchairs or for invalids, which platform can be raised and lowered from ground level to the floor of the vehicle.

Another object is to produce such a convertible step platform lift which is stable and remains horizontal throughout its vertical motions, as well as maintaining the step sections horizontal, including during their folding and unfolding movements.

A further object of this invention is to produce such a convertible step platform lift with safety devices: to stop its operation automatically when it meets an obstacle, to insure that an operator is watching the steps and plaftorm when it is being folded into steps, and to insure the proper location of the steps when they are in their folded position.

Still another object of this invention is to produce such a convertible step platform lift in which the step treads are relatively wide and deep for easy stepping, and which steps are relatively free from operating mechanisms which could interfere with the normal use of the steps and platform.

Still a further object of this invention is to provide such a convertible step platform lift which does not have hinges to become clogged with dirt.

SUMMARY OF THE INVENTION

Generally speaking, the convertible step platform lift of this invention is primarily adaptable to a passenger vehicle to replace its normally fixed steps, such as in a bus or van, with steps which unfold into a platform that can be raised and lowered for raising and lowering a wheelchair with an invalid thereon, or for an invalid standing thereon who can not maneuver the steps.

This convertible platform lift assembly comprises a pair of parallel frames mounted on the floor on each side of the rectangular notched-out floor of the vehicle, and preferably also are attached to the parallel vertical sides of the door jam above the open end of the notched-out floor. This rectangular assembly has at each corner thereof a vertical post which also act as guides for the horizontal platform as it is moved vertically up and down in the notched-out portion of the floor. The interchangeable steps and platform subassembly of this step platform lift assembly is supported, raised and lowered by a pair of parallel vertical reciprocating motors, such as hydraulic cylinders and pistons suspended from vertical slots at the top of each side frame. Cam-operated microswitches adjacent these slots are operated when an obstruction is contacted by the lowering of the platform or steps to stop automatically further operation of the vertical lifting motors. A similar safety switch mechanism is disclosed in applicant Smalley's U.S. Pat. No. 4,392,771 issued July 12, 1983.

The step-platform subassembly comprises an upper step platform section, a lower step platform section, and a vertical riser platform section pivoted on parallel shafts and tubular bearings to the front edge of the upper step section and the back edge of the lower step section. When the steps are folded in their operative step position, the riser forms an acute angle under the front edge of the upper step section, and said upper and lower step sections are in spaced horizontal planes, usually with the upper step section spaced one normal step distance below the floor of the vehicle, in the notched-out floor well for this subassembly. The fact that the riser folds rearwardly slightly under the upper step section enables both step sections and the riser section to be longer, so that when they are unfolded into the same plane to form the platform, a longer platform is obtained than the depth of the notch in the floor. One and preferably a pair of parallel substantially horizontal reciprocating motors, such as hydraulic cylinders and pistons, are pivotally supported above and outside the side panels of the upper step section, and their pistons are pivotally connected to a lever extension along and above the end edges of the riser, so that retraction of these reciprocating motors will cause the riser section to move outwardly and upwardly to unfold into its central platform position coplanar with the upper step section, and simultaneously push the lower step section out and upwardly into its platform position, so that all three sections will be in the same plane. A stop means is provided on the upper step section for limiting the lower pivotal movement of the horizontal reciprocating motor for folding and unfolding the step platform sections. The lower step section is connected to the upper step section by a pair of outside links pivoted at their ends so as to maintain the lower step section continuously horizontal throughout its movements into its folded and unfolded positions.

The outer edge of the lower step section has pivoted thereto a ramp and a barrier, both of which are normally urged by spring means into their operative position which is maintained substantially throughout the time the three platform sections are in their platform position. The ramp which is pivoted to a shaft along the front edge of the lower step section may be urged into its ramp position by a coil spring around the shaft. The barrier which is also pivoted on the same shaft, is urged into its operative barrier position by spring means on a ground-engaging shoe lever which, through link means, moves the barrier into its non barrier position, folded against the upper surface of the lower step section so that vehicles and persons can easily move to and from the platform when it is on the ground. However, as soon as the platform is raised from the ground, the resilient means such as a spring at the pivot of ground-engaging shoe lever, immediately moves the barrier into its substantially vertical barrier position to prevent a wheelchair from rolling off the platform. A flange on one end of the barrier has a slot in which a first-class lever raises the barrier into its operative barrier position against a stop that limits the backward movement or upward movement of the barrier outwardly from the platform. This link mechanism and ground-engaging shoe is similar to that disclosed in applicant Risner's copending U.S. patent application Ser. No. 408,801 filed Aug. 17, 1982, now U.S. Pat. No. 4,480,719 issued Nov. 6, 1984.

Another link is pivotally connected at one end to one lower side end of the riser and at its other end to another first-class lever pivoted at the outer edge of the vertical end panel of the lower step. This other lever is provided with a pair of spaced rollers at its outer end which engage the barrier and the ramp to fold them flat against the top and bottom sides, respectively, of the lower step section to maintain them in that position, as long as the step sections are in their step-operating position.

Separate three-way electric switches are provided for operating solenoid valves in an hydraulic system for controlling the reciprocating motors. These switches may be mounted on the frame housing and/or at any remote point such as at the station of the driver of the vehicle. One three-way switch has "up", "off" and "down" positions for operating the lift to raise and lower the platform, and another three-way switch has "in", "off", and "out" positions for folding and unfolding the steps from and into the platform, respectively. There is provided also a pushbutton bypass safety switch which must be held by the operator when the platform is being folded into its step position, so that the platform can not be folded into steps with a person on the platform. Furthermore, there is provided an additional switch, which may be at the driver's station, for raising the steps to a predetermined sensor switch position to locate the upper step section the proper distance from the floor of the vehicle.

BRIEF DESCRIPTION OF THE VIEWS

The above mentioned and other features, objects and advantages, and a manner of attaining them are described more specifically below by reference to an embodiment of this invention shown in the accompanying drawings, wherein:

FIG. I is a perspective view of a preferred embodiment of the convertible step platform lift assembly of this invention shown in its step operative position installed in an entrance door to a bus, shown in dot-dash lines;

FIG. II is a view similar to FIG. I showing the convertible step platform lift in its platform position at a location intermediate the ground and floor level of the bus, with the barrier and ramp at the front of the platform in their operative positions, and a wheelchair shown in dot-dash lines on the platform;

FIG. III is an enlarged right side elevation of the convertible step platform lift assembly shown in FIG. I with parts thereof broken away and the side panel substantially removed showing the steps in their operative position and the mechanism for converting the steps into a platform and the lift for the platform lift in its step operative position;

FIG. IV is a view of the lower half of FIG. III showing the step sections and converting mechanism in their platform operative position;

FIG. V is an enlarged vertical sectional view taken through the center of the lift assembly of the left side of the assembly shown in FIG. I with the convertible step platform lift in its platform position as shown in FIG. IV and specifically showing the mechanism for operating the barrier at the outer edge of the platform;

FIG. VI is a section taken along line VI—VI of FIG. V showing the guide rollers for the lift on the front post of the frame; and FIG. VII is a section taken along line VII—VII of FIG. V showing the right-angled guide rollers for the lift platform along the rear L-angle post of the frame.

DETAILED DESCRIPTION OF PREFERRED EMBODIMENT

A. The Assembly

Referring first to FIGS. I and II, there is shown in full lines the convertible step platform lift assembly 10 of this invention in its step position and in its platform positions, respectively, as the assembly 10 could be mounted in the door of a passenger vehicle, such as a bus or van V shown in dot-dash lines. There is a wheelchair W also shown in dot-dash lines on the platform in FIG. II, which wheelchair W is being raised from ground level to the floor level F of the van V.

This assembly 10 shown in FIGS. I and II, comprises a pair of L-shaped side panel members 12 and 14 which house an L-shaped frame 20 (see FIG. III) and the operating mechanisms for the convertible step platform lift. The bottom of the two side members 12 and 14 rest on the sides of a rectangular notch in the floor F of the vehicle, and the longer front edges of the side members 12 and 14 preferably anchored to the frame or door jam of the door D of the vehicle V, or to the side of the vehicle in which the door D is located. The frame 20 comprises four corner vertical posts, two longer or higher posts 22 and 23 in the front, and two shorter posts 24 and 25 in the rear. These posts 22 through 25 extend below the floor F of the vehicle V to about the bottom edge of the side of the vehicle, and also act as guides for the verticle movement of the platform 80 shown in FIG. II. Since the upper step 30 of the convertible steps shown in FIG. I is a normal step distance below the floor F, there is provided a permanent back or riser panel 26. Side panels 27 and 28 extend from the end edges of the first step 30 to the floor F of the bus.

B. The Folding and Unfolding Steps

Referring to FIGS. I and III, the convertible steps of this invention comprise an upper step platform section 30, a riser platform section 40, and a lower step platform section 50, which three sections or elements are connected together along pivoted shafts and tubular bearings 32 and 42 at opposite horizontal edges of the riser section 40, or at the front and rear edges of the upper step section 30 and lower step section 50, respectively. Along the opposite side or end edges of the riser section 40 there are provided lever extensions 44 above the shaft or axle 32 to the outer or upper ends of which are pivotally connected pistons 34 of a pair of reciprocating motors, such as in hydraulic cylinders 36 pivoted at their opposite ends 37 to the rear outsides of end panels 27 and 28 of the upper step section 30. Stops 38 are attached to the upper step section 30 below the pistons 34 to limit the lower oscillation of the motors 36 when the pistons 34 are retracted to form the platform as shown in FIG. IV. Mounting the reciprocating motor 36 above the bottom of the upper step section 30, permits this step section 30 when in its platform position as shown in FIG. IV to be moved so its bottom is flush with the ground, in that there is no obstruction under the step sections when they are in the platform position as shown in FIG. IV. Thus, the retraction of the pistons 34 moves the riser section 30 from its acute angle position so that its lower edge or shaft 42 is under the step section 30, into a position where the riser section 40 is coplanar with the upper step section 30 as shown in FIG. IV to form a central or intermediate section of the platform 80. Simultaneously with this riser unfolding operation, the lower step section 50 is moved further outwardly and upwardly into the position shown in FIG. IV, and is maintained horizontal throughout this motion by means of the pair of pivoted links 51 connected between the outer upper front edges of the sides 27 and 28 of the upper step section 30 and the center of the lower step section 50. Also the fact that the riser section 30 can be moved so that its lower edge is under the upper step section 30 permits wider or deeper upper and lower step sections 30 and 50 to be used, as well as a higher or wider riser section 40, so that when these three sections 30, 40 and 50 are coplanar as shown in FIGS. IV, they form a longer platform 80 than the depth of the notch in the floor F and than would be obtained if the riser section 40 was vertical or at right angles to the upper and lower step sections.

C. The Automatic Ramp and Barrier

Referring to FIG. IV there is shown pivoted along the outer edge of the lower step section 50 on platform 80, a normally outwardly urged ramp or plate 60, and a normally vertically urged barrier or plate 70, both of which plates 60 and 70 are shown in their operative positions when the step sections 30, 40 and 50 are in coplanar alignment to form a platform 80. The ramp 60 may be urged into this position by a helical spring 64 around the shaft 62.

Referring to FIG. V there is shown the linkage and levers employed for operating the barrier 70, which also is pivoted on the shaft 62. This barrier 70 has an orthogonal flange 71 at at least one of its ends, which flange 71 has a vertical slot 72 as shown in FIG. V into which slot 72 is journalled one end of a first-class lever 74. This lever 74 is pivoted at 73 onto the adjacent one of the two vertical end panels or sides 52 of the step section 50. The other end of this lever 74 is pivoted to a link 76 which extends through a slot in the lower step section adjacent the end panel 52, to a pivot on a ground-engaging shoe lever 78 pivoted at 77 to underside of the lower step section 50. Around this pivot 77 may be provided a helical spring 79 for normally urging the ground-engaging shoe lever 78 into its downwardly extending position shown in FIG. V, thus normally maintaining the barrier 70 in its barrier-operating position. The bottom edge of the flange 71 on the barrier 70 may act as a stop to limit the upward and outward movement of the barrier or plate 70 to its vertical position shown in FIG. V. When the shoe lever 78 contacts the ground when the platform 80 is in its lowermost position, the shoe 78 is pushed upwardly flush against the bottom of the lower step section 50, which in turn pushes the link 76 upwardly to operate the lever 74 to move or fold the barrier 70 down flush against the upper surface of the outer and lower step section 50, as shown in FIG. III.

Also, as shown in FIGS. III and IV, there is provided an additional link and lever means comprising a lever 66 centrally pivoted at 65 on the outside of at least one of the end panels 52 of the lower step section 50, the inner or upper end of which lever 66 is pivotally connected by a link 67 to the lower end of the edge of the riser section 40. The other or outer end of this lever 66 is provided with a pair of spaced rollers 68 and 69, which rollers 68 and 69, when the step sections 30, 40, and 50 are moved and held in their step operative position shown in FIG. III, engage the top of the ramp 60 and back of the barrier 70 to fold and hold them into their non-operative positions parallel to each other and against the top and bottom outer edge of the lower step section 50 as shown in FIG. III. A notch 53 may be provided in the plate 52 for the roller 68 (see FIGS. III and IV). Then when the step sections 30, 40 and 50 are extended into their platform position 80 as shown in FIGS. IV and V, the lever 66 is extended away from engaging the ramp and barrier 70, so that they are normally urged into their operative positions by their respective springs 64 and 79. To insure flushness of the surface of the lower step section 50 with the folded-over ramp plate 70, the rest of the step 50 surface is covered with a tread 55 of substantially the same thickness as the ramp plate 70.

D. The Lift Mechanism

The subassembly which is vertically raised and lowered comprises the three step sections 30, 40 and 50, which unfold into the platform 80, and their operative mechanisms, including the reciprocating motors 36 on the outside of each side panel 27 and 28 of the upper step section 30. Extending upwardly from the upper step section 30 and surrounding the front longer supporting post 22 and 23, are a pair of telescoping slides or guide members 82 and 83 which have mounted thereon at least two spaced pairs of guide rollers 86, preferably of nylon plastic, for guiding the assembly (see also FIG. VI). Similarly, the rear edges of the panels 27 and 28 are provided with a plurality of orthogonally positioned guide rollers 87 and 88 (see also FIG. VII) for guiding the rear end of the lift assembly 80 up and down the shorter rear L-shaped cross-section angle posts 24 and 25. These combination of the rollers on the opposite and adjacent sides of the posts 22, 23, 24 and 25 insure the horizontal levelness of the platform 80 throughout its vertical movements, and prevent it from being canted in the event it is not evenly or centrally loaded. The use of these plastic rollers reduces the need for continued lubrication of the apparatus, reducing its maintenance and improving its efficiency.

A pair of vertical reciprocating motors 90 are suspended in slots 92 anchored to the upper end of the longer legs of the L-shaped frames 20, and the pistons 94 extending downwardly from these reciprocating motors, herein hydraulic motors. The lower ends of these pistons 94 are pivotally connected to the opposite ends of the shaft 32 which journals the joint between the upper step section 30 and the riser section 40. This shaft 32 also pivots the lever extensions 44 at the end of the riser 40. Adjacent the slot 92 there is provided a cam 96 and microswitch 98 which is a safety device to shut off the solenoid valve that supplied fluid pressure to the vertical reciprocating motors 90 in the event the lift or vertically movable subassembly strikes an obstacle on its downward movement, including the ground at its lower limit. Its upper limit of this platform 80 on subassembly is determined by the length of the pistons 94, which is pre-gauged to be where the upper surface of the platform 80 is coplanar to the floor F.

Ducts 95 supply fluid pressure to both ends of the hydraulic motor cylinders 90 and are connected through solenoid valves (not shown) operated by electric switches 100, 102 and 104 and 106. These valves control the hydraulic pressure from an electric motor and hydraulic pump and reservoir power supply (not shown) which may be placed at a convenient location in the vehicle, usually adjacent the door or behind one of the panels 12 or 14. Similarly, ducts 39 extend from opposite ends of the reciprocating hydraulic motors 36 to other solenoid valves (not shown) for operating the conversion mechanisms for the step sections 30, 40 and 50 into a platform 80 and vice versa.

The switches 100 and 102 may comprise three-way switches and may be mounted on the inner side of the upper end of the housing of the L-shaped panel member 14 (see FIG. III). The upper one of these switches 100 may have an "up" and "down" and middle-neutral or "stop" position for operating the solenoid valves which raise and lower the platform assembly 80 between its limits, as well as raising and lowering the assembly when in the step operating position as shown in FIG. III, so that the upper step 30 can be raised to its proper position below the floor F controlled by a limit switch 106 (see FIGS. III and IV). This limit or sensor switch 106 may be in a circuit with another manual switch (not shown) that may be mounted at the driver's station, to raise the platform until the sensor switch 106 is contacted, such as by the upper edge of the panel 28 of the upper step section 30. If the upper step section is higher than or above this sensor switch 106, the assembly first must be lowered below it before it can be raised to the proper position below the floor F for the first step out of the bus or van V.

The other three-way switch 102 on the outside of the housing of the side panel member 14 may have an "in" and "out" and a neutral or "stop" position for operating the reciprocating motors 36 to unfold and fold the step sections 30, 40 and 50. The "out" position of switch 102 retracts the piston 34 to the position shown in FIGS. IV and V to form the platform 80 from the step sections 30, 40 and 50. There is provided an additional safety button switch 104, connected in the circuit for switch 102, which also must be held when the switch 102 is moved into its "in" position, i.e. for folding the platform 80 into its step position shown in FIG. III, so as to prevent erroneous operation and folding of the platform 80 when someone is on the platform 80.

While there is described above the principles of this invention in connection with specific apparatus, it is to be clearly understood that this description is made only by way of example and not as a limitation to the scope of this invention.

We claim:

1. A convertible step-platform lift for a vehicle comprising:
   (A) a step-platform assembly comprising:
     (1) an upper step-platform section having an outer edge hinge shaft,
     (2) a riser step-platform section hinged at its upper edge to said outer edge hinge shaft and having a lower edge hinge shaft,
     (3) a lever means affixed to and projecting from beyond the upper edge of an end of said riser.
     (4) a lower step-platform section hinged at its inner edge to said lower edge hinged shaft of said riser,
     (5) a reciprocating motor means connected between said upper step-platform section and the upper end of said lever means for folding and unfolding said step and riser platform sections from their step position to their platform position and vice versa, and
     (6) means for maintaining said step sections horizontal; and
   (B) means for vertically raising and lowering said platform assembly attached to the end of said outer edge hinge shaft of said upper step-platform section.

2. A convertible step-platform lift according to claim 1 including a frame mounted around a notch in the floor of said vehicle for mounting said step-platform assembly.

3. A convertible step-platform lift according to claim 2 including roller guide means between said frame and said step-platform assembly.

4. A convertible step-platform lift according to claim 1 wherein said reciprocating motor means is pivotally connected between said upper step-platform section and the upper end of said lever means.

5. A convertible step-platform lift according to claim 4 including stop means for limiting the pivotal movement of said reciprocating motor means when in its platform position.

6. A convertible step-platform lift according to claim 1 including an outer end hinge shaft on said lower step-platform section, and a barrier hinged thereto.

7. A convertible step-platform lift according to claim 6 including resilient means for normally urging said barrier into its barrier position.

8. A convertible step-platform lift according to claim 6 including ground-engaging means for moving said barrier into its non-barrier position.

9. A convertible step-platform lift according to claim 6 including a stop for limiting the barrier to its barrier position.

10. A convertible step-platform lift according to claim 6 including means connected to said riser section for holding said barrier into its non-barrier position when said steps are in their step position.

11. A convertible step-platform lift according to claim 6 including a tread layer on the upper side of at least said lower step-platform section with its upper surface flush with the upper surface of said barrier when in its non-barrier position and said steps are in their step position.

12. A convertible step-platform lift according to claim 1 including an outer end hinge shaft on said lower step-platform section, and a ramp section hinged thereto.

13. A convertible step-platform lift according to claim 12 including resilient means for normally urging said ramp toward its operative ramp position.

14. A convertible step-platform lift according to claim 12 including means connected to said riser section for holding said ramp in its non-operative position when said steps are in their step position.

15. A convertible step-platform lift according to claim 1 including means for normally preventing the operation of said reciprocating motor means when said platform assembly is in its platform position.

16. A convertible step-platform lift according to claim 1 including means for stopping said means for raising and lowering said platform assembly when said assembly hits an obstacle during lowering.

17. A convertible step-platform lift according to claim 1 wherein said means for vertically raising and lowering said platform assembly comprises a vertically reciprocating motor limited in its upper position by the inherent structure of said motor.

18. A convertible step-platform lift according to claim 1 wherein said vertically reciprocating motor comprises a hydraulic piston and cylinder.

19. A convertible step-platform lift according to claim 1 including a sensor switch for locating the position of said upper step-platform section when in its step-forming position.

20. A convertible step-platform lift according to claim 1 wherein said means for maintaining said step sections horizontal comprises a pivoted link extending between said upper and said lower step sections.

21. A convertible step-platform lift for a vehicle comprising:
 (A) a step-platform assembly comprising:
  (1) an upper step-platform section having an outer edge hinge shaft,
  (2) a riser step-platform section hinged at its upper edge to said outer edge hinge shaft and having a lower edge hinge shaft,
  (3) a lever means affixed to and projecting from beyond the upper edge of an end of said riser,
  (4) a lower step-platform section hinged at its inner edge to said lower edge hinged shaft of said riser and having an outer edge hinge shaft,
  (5) a barrier hinged to said outer end hinge shaft of said lower step-platform section,
  (6) a ramp section hinged to said outer end hinge shaft of said lower step-platform section,
  (7) a reciprocating motor means connected between said upper step-platform section and the upper end of said lever means for folding and unfolding said step and riser platform sections from their step position to their platform position and vice versa,
  (8) a pivoted link means between said upper step-platform section and said lower step-platform section for maintaining said step sections horizontal,
  (9) separate resilient means for normally urging said barrier into its barrier position, and for normally urging said ramp section toward its ramp operative position,
  (10) ground-engaging means for moving said barrier into its non-barrier position, and
  (11) separate means connected to said riser section for holding said barrier and ramp into their non-barrier and non-operative ramp positions when said steps are in their step position; and
 (B) means for vertically raising and lowering said platform assembly.

22. A convertible step-platform lift according to claim 21 including a frame mounted around a notch in the floor of said vehicle for mounting said step-platform assembly.

23. A convertible step-platform lift according to claim 22 including roller guide means between said frame and said step-platform assembly.

24. A convertible step-platform lift according to claim 21 wherein said means for vertically raising and lowering said platform is attached to the ends of said upper step front hinge shaft.

25. A convertible step-platform lift according to claim 21 wherein said reciprocating motor means is pivotally connected between said upper step-platform section and the upper end of said lever means.

26. A convertible step-platform lift according to claim 25 including stop means for limiting the pivoted movement of said reciprocating motor means when in its platform position.

27. A convertible step-platform lift according to claim 21 including a stop for limiting the barrier to its barrier position.

28. A convertible step-platform lift according to claim 21 including a tread layer on the upper side of at least said lower step-platform section with its upper surface flush with the upper surface of said barrier when in its non-barrier position and said steps are in their step position.

29. A convertible step-platform lift according to claim 21 including means for normally preventing the operation of said reciprocating motor means when said platform assembly is in its platform position.

30. A convertible step-platform lift according to claim 21 including means for stopping said means for raising and lowering said platform assembly when said assembly hits an obstacle during lowering.

31. A convertible step-platform lift according to claim 21 wherein said means for vertically raising and lowering said platform assembly comprises a vertically reciprocating motor limited in its upper position by the inherent structure of said motor.

32. A convertible step-platform lift according to claim 31 wherein said vertically reciprocating motor comprises a hydraulic piston and cylinder.

33. A convertible step-platform lift according to claim 21 including a sensor switch for locating the position of said upper step-platform section when in its step-forming position.

* * * * *